US011909567B2

United States Patent
Wachi

(10) Patent No.: US 11,909,567 B2
(45) Date of Patent: Feb. 20, 2024

(54) EQUALIZER AND EQUALIZATION SYSTEM

(71) Applicant: Hitachi, Ltd., Tokyo (JP)

(72) Inventor: Yusuke Wachi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/849,870

(22) Filed: Jun. 27, 2022

(65) Prior Publication Data

US 2023/0013719 A1 Jan. 19, 2023

(30) Foreign Application Priority Data

Jul. 14, 2021 (JP) ................. 2021-116700

(51) Int. Cl.
*H04B 1/16* (2006.01)
*H04L 25/03* (2006.01)
*H04L 25/06* (2006.01)
*H04L 25/02* (2006.01)

(52) U.S. Cl.
CPC .... *H04L 25/03267* (2013.01); *H04L 25/0258* (2013.01); *H04L 25/03019* (2013.01); *H04L 25/069* (2013.01)

(58) Field of Classification Search
CPC ......... H04L 25/03057; H04L 25/03885; H04L 25/03019; H04L 7/033; H04L 25/03343; H04B 3/04; H04B 1/16; H04B 10/00; H04B 10/0795; H04B 10/541; H04B 10/66; H04B 10/6911; H04J 13/0003
USPC ....................................... 375/262
See application file for complete search history.

(56) References Cited

U.S. PATENT DOCUMENTS

| 9,438,450 | B1* | 9/2016 | Kang ................. H04L 25/03057 |
| 10,841,134 | B1 | 11/2020 | Wachi et al. | |
| 10,992,501 | B1* | 4/2021 | Sun .......................... H03L 7/081 |
| 2010/0329325 | A1* | 12/2010 | Mobin .............. H04L 25/03343 375/232 |
| 2019/0052488 | A1* | 2/2019 | Fujii ................. H04L 25/03878 |
| 2021/0091921 | A1* | 3/2021 | Nodenot ................. H04L 1/205 |

FOREIGN PATENT DOCUMENTS

JP 2020205540 A 12/2020

* cited by examiner

*Primary Examiner* — Eva Y Puente
(74) *Attorney, Agent, or Firm* — Miles & Stockbridge, P.C.

(57) ABSTRACT

An equalizer that has a wide variable gain range and that can implement equalization for a communication medium such as on-board wiring or a cable having various wiring lengths. The equalizer includes a core circuit and a source follower connected to a subsequent stage of the core circuit. The core circuit includes a differential pair including a first transistor and a second transistor, and a zero point generation circuit connected between a second terminal of the first transistor and a second terminal of the second transistor. The source follower includes a third transistor and a fourth transistor, a variable bias current source is connected to the third and fourth transistors, and a load in which a capacitive element and a resistor element are connected in series via a switching element is connected to wiring that connects the third and fourth transistors to an output terminal.

10 Claims, 10 Drawing Sheets

EQUALIZER AND EQUALIZATION SYSTEM

BACKGROUND OF THE INVENTION

1. Field of the Invention

The present invention relates to a technique for equalizing a signal waveform, and particularly to an equalizer and an equalization system.

2. Description of the Related Art

When information is transmitted in a wired or wireless manner, if a transmitted signal cannot be obtained correctly on a reception side, a distortion or a data error occurs. Actually, not limited to wired or wireless communication, there are some characteristics in transmission paths. An equalizer restores signals changed by these transmission paths to signals suitable for a receiver.

With the spread of 5G and AI, everything is connected to the Internet, and an amount of data traffic is expected to reach 4.8 ZB in 2022. Particularly, with regard to a PCI Express interface standard, the fifth generation standard PCIe 5.0 has been established in 2019, and an amount of communication data reaches 32 Gbps/lane on one side, which is twice a previous generation (with regard to the sixth generation standard PCIe 6.0 which will be established in 2021, the amount of communication data reaches 64 Gbps/lane on one side, which is twice the speed of PCIe 5.0). Due to the recent increase in communication speed, transmission loss in a communication medium such as on-board wiring and a cable that transmits a signal increases.

Generally, a signal transmitted via a communication medium is input to a linear equalizer having a waveform equalizing function to compensate for a frequency characteristic of a transmission path and having a low latency characteristic. According to the increase of the amount of communication data, an upper limit frequency compensated by the linear equalizer continuously increases (Nyquist frequency of 16 GHz in PCIe 5.0), and a frequency range to be compensated becomes a wide range from a low frequency to a high frequency.

When a capacitance value of a zero point generation circuit connected between emitter terminals of a differential pair including two bipolar transistors of a linear equalizer in the related art is switched and controlled and a zero point frequency is switched to obtain a wide variable gain range, a parasitic capacitor of emitter node wiring may be affected, and a gain may not be lowered to a desired gain at the time of setting a lower limit gain of the linear equalizer. In order to solve this problem, JP-A-2020-205540 discloses a linear equalizer having a wide variable gain range by adopting a configuration in which the differential pair and the zero point generation circuit are arranged and connected in parallel to a plurality of blocks and reducing the influence of the increase in the parasitic capacitor.

In order to deal with various wiring lengths of the communication medium such as the on-board wiring and the cable, the equalizer needs to have not only a wide frequency characteristic but also the wide variable gain range. In JP-A-2020-205540, in a type of linear equalizer provided with a resistor element and a capacitive element between the emitter node wiring of the differential pair, in a linear equalizer in the related art, when a gain at a time of setting an upper limit gain is to be secured, a parasitic capacitor is increased in the emitter node wiring, the gain cannot be reduced at a time of setting a lower limit gain of the equalizer due to the parasitic capacitor, and the variable gain range cannot be arranged. In response to this problem, a linear equalizer is proposed in which a plurality of blocks of the differential pair and the emitter node are parallelized to reduce the parasitic capacitor and expand the variable gain range. However, it has been found that the linear equalizer according to JP-A-2020-205540 has a limit to reduce the parasitic capacitor.

SUMMARY OF THE INVENTION

An object of the invention is to provide an equalizer and an equalization system that have a wider variable gain range and that can implement equalization for a communication medium such as on-board wiring and a cable having various wiring lengths.

A preferred example of the equalizer according to the invention includes a core circuit configured to receive a signal transmitted via a communication medium and a source follower connected to a subsequent stage of the core circuit. The core circuit includes a differential pair including a first transistor and a second transistor, a first terminal of the first transistor and a first terminal of the second transistor are connected to an input terminal, a first resistor is connected to second terminals of the first and second transistors, a zero point generation circuit is connected between the second terminal of the first transistor and the second terminal of the second transistor, and a second resistor is connected to third terminals of the first and second transistors. The source follower includes a third transistor that connects a first terminal to the third terminal of the first transistor and a fourth transistor that connects a first terminal to the third terminal of the second transistor, a variable bias current source is connected to second terminals of the third and fourth transistors, and a load in which a capacitive element and a resistor element are connected in series via a switching element is connected to wiring that connects the second terminals of the third and fourth transistors to an output terminal.

In a preferred example of the equalization system according to the invention, the equalizer is mounted on a linear repeater, a loss of a data signal transmitted by a first communication medium in the communication medium is equalized and compensated by the equalizer, the compensated data signal is transmitted to a receiver via a second communication medium by a driver circuit of the linear repeater, an EYE monitor provided in the receiver monitors an eye pattern based on a waveform of the received data signal and outputs an evaluation value of an opening degree of an eye pattern opening portion, a CAL logic circuit provided in the linear repeater executes a calibration loop in which control is executed to apply a displacement amount stepwise to a value of a mutual conductance gm2 of third and fourth transistors of the equalizer, in which an evaluation value of an opening degree of the eye pattern opening portion of a data signal equalized by the equalizer at each stage is acquired from the EYE monitor, and in which a gm2 adjustment value is searched for and set at which the opening degree of the eye pattern opening portion is the maximum, and a gm2 adjustment unit mounted on the linear repeater receives a control instruction to apply the displacement amount stepwise from the CAL logic circuit to the gm2 value, and applies a voltage corresponding to a first terminal of a variable bias current source connected to second terminals of the third and fourth transistors of the equalizer according to the control instruction.

According to the invention, it is possible to provide an equalizer that has a wide variable gain range and that can implement equalization for the communication medium such as the on-board wiring and the cable having various wiring lengths.

DESCRIPTION OF THE PREFERRED EMBODIMENTS

Figure 1:
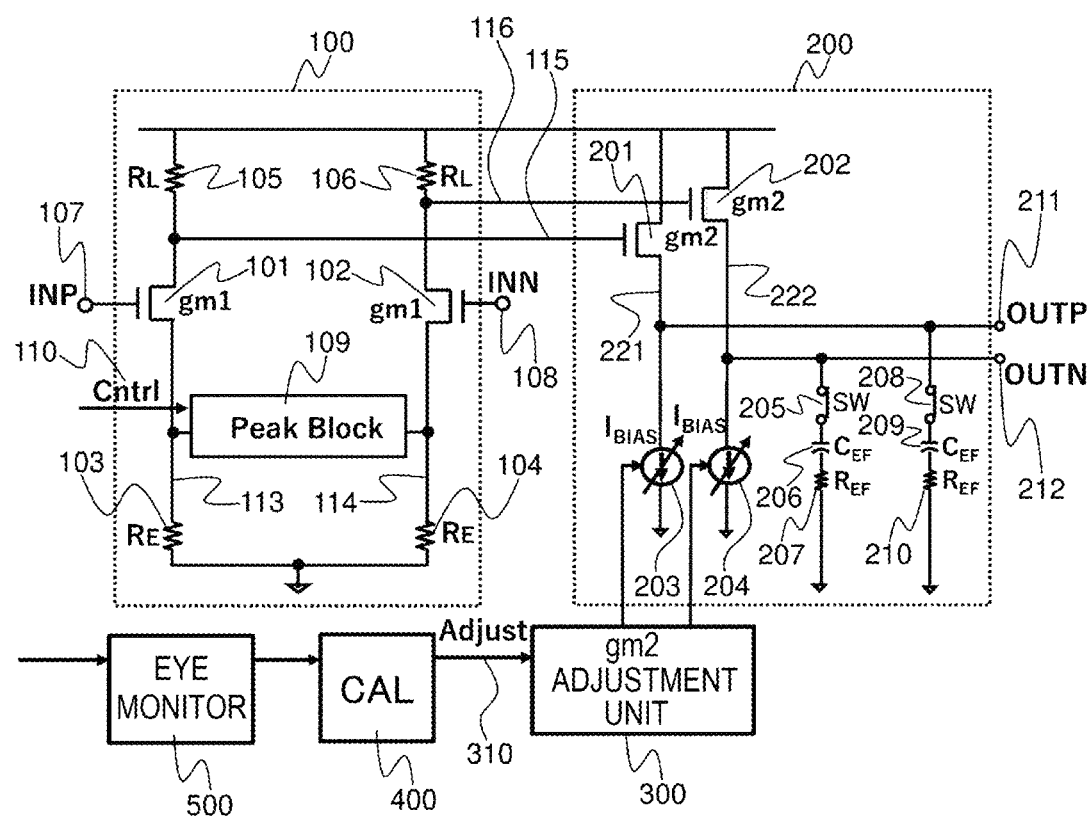
FIG. 1 is a circuit diagram illustrating an equalizer according to a first embodiment.

Embodiments will be described in detail with reference to the drawings. However, the invention is not construed as being limited to the description of the embodiments shown below. Those skilled in the art could have easily understood that specific configuration can be changed without departing from a spirit or a gist of the invention.

In configurations of the invention described below, the same reference numerals may be used in common among different drawings for the same parts or parts having similar functions, and the duplicate description may be omitted.

When there are a plurality of elements having the same or similar functions, the elements may be described by adding different indexes to the same reference numeral. However, when it is unnecessary to distinguish the plurality of elements, the elements may be described by omitting the indexes.

In the present specification, expressions such as "first", "second", and "third" are used to identify components, and do not necessarily limit numbers, orders, or contents thereof. Numbers for identifying the components are used for each context, and the numbers used in one context do not always indicate the same configuration in other contexts. The component identified by a certain number may have a function of a component identified by another number.

In order to facilitate understanding of the invention, a position, a size, a shape, a range, and the like of each configuration illustrated in the drawings may not represent an actual position, size, shape, range, and the like. Therefore, the invention is not necessarily limited to the position, the size, the shape, the range, and the like disclosed with reference to the drawings.

All publications, patents, and patent applications cited in the present specification form a part of the present specification as they are.

Components represented in a singular form in the present specification include a plural form unless explicitly indicated in the context.

Prior to the description of the invention, a problem of an equalizer (in the following embodiments, a linear equalizer will be simply referred to as an equalizer) in the related art will be described with reference to FIGS. 11, 12, 13A, and 13B.

Figure 11:
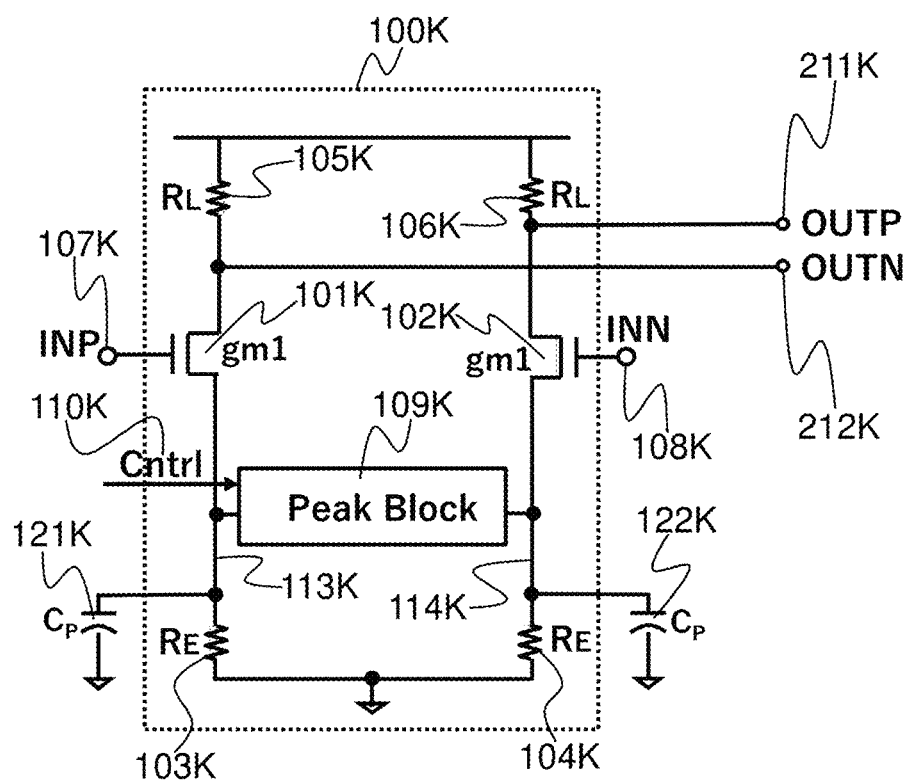
FIG. 11 is a circuit diagram illustrating the equalizer in the related art.

FIG. 11 is a circuit diagram of an equalizer 100K in the related art. As illustrated in FIG. 11, the equalizer 100K is an equalizer that receives signals (INP and INN) transmitted via a communication medium that transmits a signal. This equalizer has a differential pair including a first metal-oxide-semiconductor field-effect transistor (MOSFET) 101K that inputs the signal (INP) to a gate input terminal 107K and a second MOSFET 102K that inputs the signal (INN) to a gate input terminal 108K. Both mutual conductances of the first and second MOSFETs are gm1.

Resistors 103K and 104K and a zero point generation circuit (Peak Block) 109K are connected between source node wiring 113K and 114K of the differential pair. A drain terminal of the first MOSFET 101K is connected to a load resistor 105K and is used as an output terminal (OUTP) 211K of the equalizer 100K, and a drain terminal of the second MOSFET 102K is connected to a load resistor 106K and is used as an output terminal (OUTN) 212K of the equalizer 100K.

Figure 12:
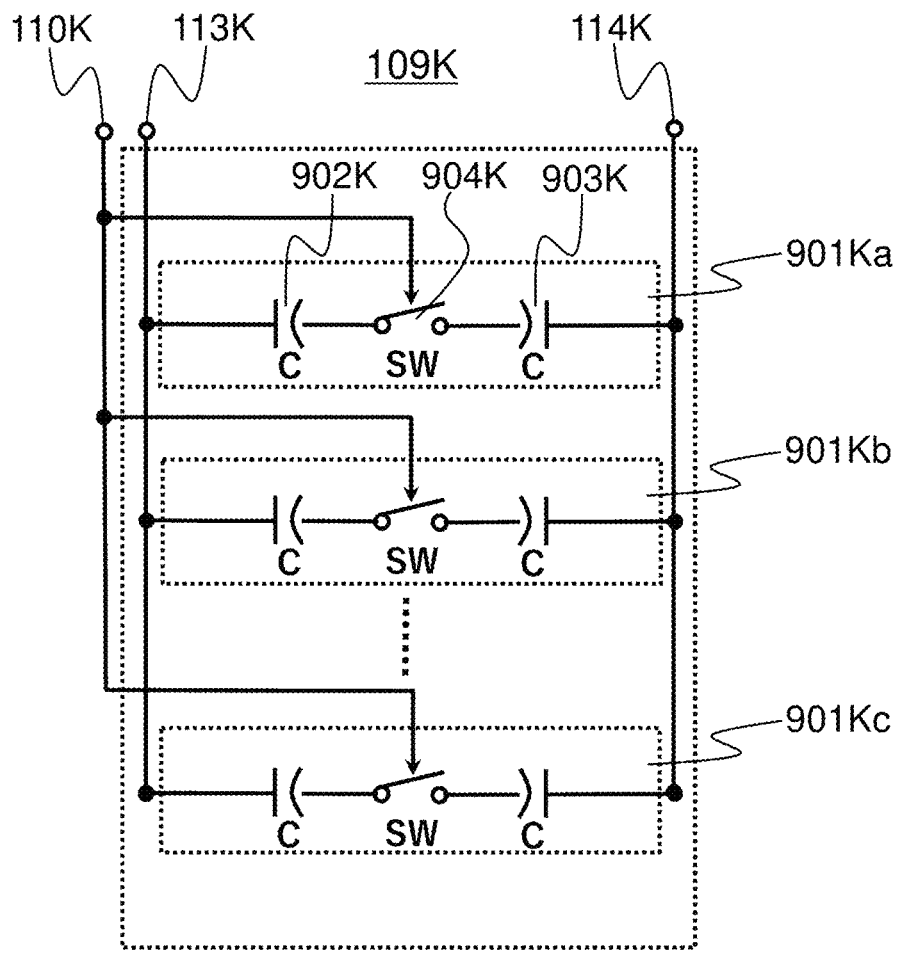
FIG. 12 is a circuit diagram illustrating an example of the zero point generation circuit of the equalizer in the related art.

FIG. 12 is an example of the zero point generation circuit 109K constituting the equalizer 100K in the related art. The zero point generation circuit 109K includes one or more zero point generation unit circuits 901Ka, 901Kb, and 901Kc, and each zero point generation unit circuit 901K includes one or more capacitors (C) 902K and 903K and an ON/OFF changeover switch (SW) 904K. The changeover switch 904K is controlled with a control signal 110K, and capacitors (C) attached to source node wiring 113K and 114K are switched, so that frequencies at a zero point generated by resistors (RE) 103K and 104K can be switched.

Wiring widths W of the source node wiring 113K and 114K of the equalizer 100K are determined according to a current density defined by an electromigration rule. As an operation frequency of the circuit increases, a current value increases in order to secure a high frequency characteristic, and thus the wiring becomes thicker. On the other hand, as the number of blocks constituting the zero point generation circuit 109K increases, and as a physical size of a capacitive element or the like constituting the zero point generation unit circuit increases, wiring lengths L of the source node wiring 113K and 114K become larger.

Parasitic capacitors ($C_P$) 121K and 122K proportional to an area W×L obtained by the wiring width W and the wiring length L are added to the source node wiring 113K and 114K. That is, not only capacitors constituting the zero point generation circuit 109K but also the parasitic capacitors $C_P$ are unnecessarily connected to the source node wiring 113K and 114K. An influence of the parasitic capacitor $C_P$ will be described with reference to FIGS. 13A and 13B. In a circuit of the equalizer 100K in FIG. 11, a zero point frequency when an upper limit gain for setting a peak gain to the maximum is set (all the changeover switches 904K are ON) is $1/(2\pi \times RE \times (C_P + C_{HF\_15}))$. On the other hand, the zero point frequency when a lower limit gain for setting the peak gain to the minimum is set (all the changeover switches 904K are OFF) is $1/(2\pi \times RE \times (C_P + C_{HF\_0}))$. In this example, the number of stages of the zero point generation circuit 109K is 15, and $C_{HF\_n}$ is a capacitance value configured with the zero point generation circuit 109K when n stages are connected.

Figure 13A:
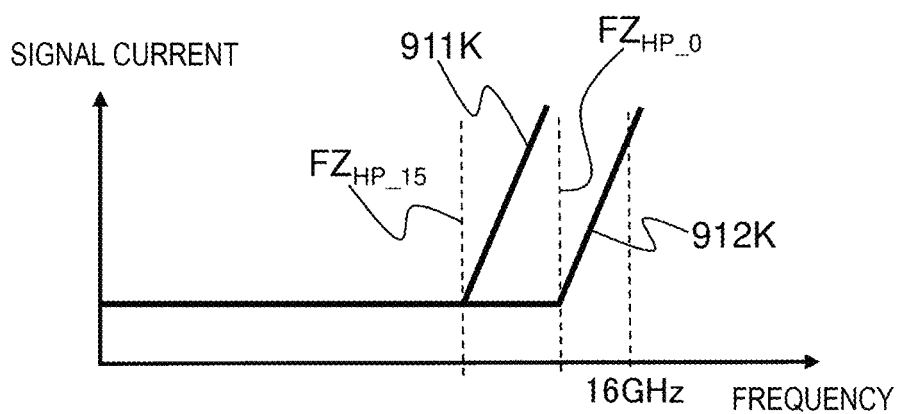
FIG. 13A is a graph schematically illustrating a signal current according to a zero point frequency of the equalizer in the related art.

FIG. 13A is a graph schematically illustrating a signal current according to the zero point frequency of the equalizer 100K in FIG. 11. A frequency characteristic 911K of the signal current when the upper limit gain is set and a frequency characteristic 912K of the signal current when the lower limit gain is set are illustrated. A zero point frequency $FZ_{HP\_15}$ when the upper limit gain is set and a zero point frequency $FZ_{HP\_0}$ when the lower limit gain is set are illustrated. As illustrated in the drawings, the zero point frequency is a frequency at which the rise of the signal starts.

$$FZ_{HP\_15} = 1/(2\pi \times RE \times (C_P + C_{HF\_15}))$$

$$FZ_{HP\_0} = 1/(2\pi \times RE \times (C_P + C_{HF\_0}))$$

$$C_{HF\_15} > C_{HF\_0}$$

RE is resistance values of the resistors 103K and 104K.

Figure 13B:
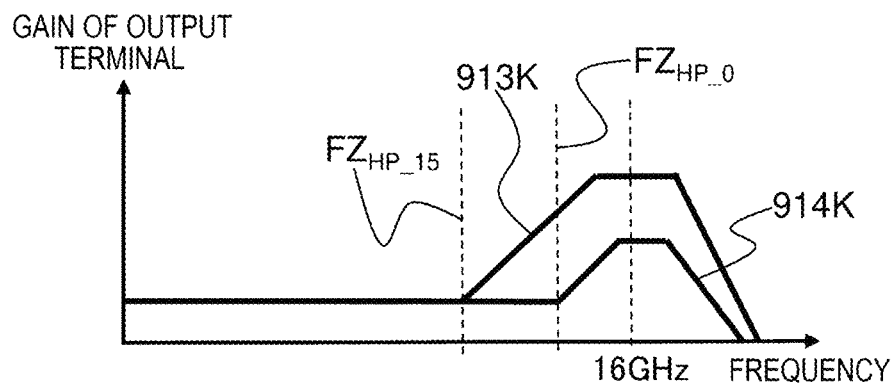
FIG. 13B is a graph schematically illustrating the gain of the output terminal according to the zero point frequency of the equalizer in the related art.

FIG. 13B is a graph schematically illustrating gains of the output terminals (OUTP and OUTN) according to the zero point frequency of the equalizer 100K in FIG. 11. A frequency characteristic 913K of the gain when the upper limit gain of the equalizer is set and a frequency characteristic 914K of the gain when the lower limit gain of the equalizer is set are illustrated. The zero point frequency $FZ_{HP\_15}$ when the upper limit gain is set and the zero point frequency $FZ_{HP\_0}$ when the lower limit gain is set are illustrated.

As illustrated in FIG. 13A, the signal current flowing through the load resistors (RL) 105K and 106K starts increasing from the zero point frequency. Here, if a capacitive element size of the zero point generation circuit is increased or the number of blocks of the zero point generation unit circuit is increased, in order to secure the gain when the upper limit gain is set, a length of connected wiring increases, the parasitic capacitor $C_P$ increases, and the parasitic capacitor $C_P$ becomes dominant when the lower limit gain is set. Therefore, the zero point frequency $FZ_{HP\_0}$ when the lower limit gain is set cannot be shifted to a high frequency side. Accordingly, with respect to the gain characteristic in the output terminal in FIG. 13B, a desired gain can be secured when the upper limit gain is set at a desired frequency (for example, a Nyquist frequency 16 GHz of PCIe 5.0), but there is a problem in that the gain cannot be reduced to the desired gain when the lower limit gain is set.

Based on the above problem, the embodiments of the invention will be described below.

First Embodiment

FIG. 1 is a circuit diagram illustrating an equalizer according to a first embodiment which is one of embodiments of the invention. As illustrated in FIG. 1, an equalizer core circuit 100 corresponding to the equalizer 100K in the related art illustrated in FIG. 11 is an equalizer that receives differential signals (INP and INN) transmitted via a communication medium. The communication medium transmits a signal. This equalizer core circuit 100 includes a differential pair including a first MOSFET 101 that inputs the signal (INP) to a gate input terminal 107 and a second MOSFET 102 that inputs the signal (INN) to a gate input terminal 108. Both mutual conductances of the first and second MOSFETs are gm1.

Resistors 103 and 104 and a zero point generation circuit (Peak Block) 109 are connected between source node wiring 113 and 114 of the differential pair. A control signal 110 for controlling ON/OFF of a capacitance changeover switch is input to a zero point generation circuit 109.

A drain terminal of the first MOSFET 101 is connected to a load resistor 105 and a drain terminal of the second MOSFET 102 is connected to a load resistor 106, and outputs of the equalizer core circuit 100 are output to drain node wiring 115 of the first MOSFET 101 and drain node wiring 116 of the second MOSFET 102.

A source follower 200 is connected to a subsequent stage of the equalizer core circuit 100. The source follower 200 includes a third MOSFET 201 that inputs a first output 115 of the core circuit 100 to the gate input terminal, and a fourth MOSFET 202 that inputs a second output 116 of the core circuit 100 to the gate input terminal. Both mutual conductances of the third and fourth MOSFETs are gm2.

In the source follower 200, a variable bias current source 203 is connected to source node wiring 221 of the third MOSFET, and a variable bias current source 204 is connected to source node wiring 222 of the fourth MOSFET. Loads, in which capacitive elements 206 and 209 and resistor elements 207 and 210 are respectively connected in series via ON/OFF switches 205 and 208, are connected to the source node wiring 221 and 222 connected to an output terminal (OUTP) 211 and an output terminal (OUTN) 212.

Figure 4:
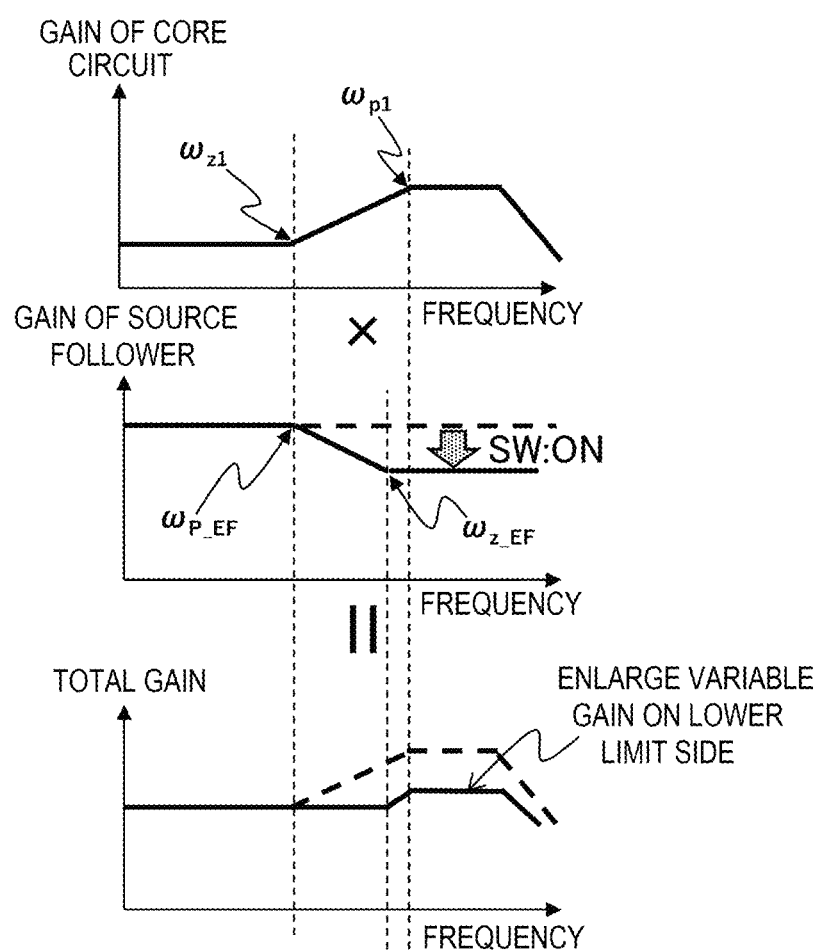
FIG. 4 is a diagram illustrating a gain range expansion effect attained by connecting a source follower to an equalizer core circuit according to the first embodiment and implementing the equalizer.

FIG. 4 illustrates a gain range expansion effect attained by connecting the source follower 200 to the equalizer core circuit 100 and implementing the equalizer.

The upper graph is a graph schematically illustrating a gain of the output of the core circuit 100 alone, and the frequency characteristic of the gain when the lower limit gain is set in the zero point generation circuit 109. ωz1 represents the zero point frequency, ωp1 represents a pole frequency.

$$\omega z1 = 1/(C_P + C_E)R_E \qquad (1)$$

$$\omega p1 = gm1/(C_P + C_E) \qquad (2)$$

Here, $C_P$ represents a parasitic capacitor of the source node wiring 113 and 114 of the core circuit, $C_E$ represents a capacitance value when the lower limit gain is set in the zero point generation circuit 109, and $R_E$ represents a resistance value of the resistors 103 and 104. This graph corresponds to a frequency characteristic 914K of the gain when the lower limit gain of the equalizer in the related art illustrated in FIG. 13B is set.

The middle graph is a graph schematically illustrating the frequency characteristic of the gain when the gain of the output of the source follower 200 alone is switched from OFF to ON by the ON/OFF switches 205 and 208. $\omega_{P\_EF}$ represents a pole frequency, and $\omega_{Z\_EF}$ represents a zero point frequency.

$$\omega_{P\_EF} = gm2/C_{EF}(1+gm2 \cdot R_{EF}) \qquad (3)$$

$$\omega_{Z\_EF} = 1/C_{EF} \cdot R_{EF} \qquad (4)$$

Here, gm2 represents mutual conductances of the third MOSFET 201 and the fourth MOSFET 202, $C_{EF}$ represents capacitance values of the capacitive elements 206 and 209, and $R_{EF}$ represents resistance values of the resistor elements 207 and 210. As illustrated in the middle graph, the frequency characteristic of the gain of the source follower 200 alone includes a characteristic to start decreasing from the pole frequency.

The lower graph is a graph schematically illustrating a frequency characteristic of a total gain of an equalizer including the core circuit 100 and the source follower 200 illustrated in FIG. 1. By multiplying the frequency characteristic of the gain of the core circuit and the frequency characteristic of the gain of the source follower, an effect of enlarging a variable gain on the lower limit side (decreasing to a desired gain in a desired frequency region) can be expected as the frequency characteristic of the total gain.

For this purpose, it is necessary to approximately adjust the capacitance value $C_{EF}$ of the capacitive elements 206 and 209 of the source follower 200 and the resistance value $R_{EF}$ of the resistor elements 207 and 210 such that the zero point frequency $\omega z1$ of the core circuit 100 and the pole frequency $\omega_{P\_EF}$ of the source follower 200 coincide with each other.

When the equalizer including the core circuit 100 and the source follower 200 according to the present embodiment is actually operated, it is basically assumed that a user inputs and sets the control signal 110 of a load changeover switch of the zero point generation circuit 109 of the core circuit 100 and the control signal of a load changeover switch of the source follower 200 (not shown) in consideration of use environment or the like at a time of the equalizer being mounted on an actual machine. However, a use method is also assumed in which a temperature monitor, a power supply voltage monitor, or the like is put in the actual machine and is dynamically adjusted.

The value of the mutual conductance gm2 of the third and fourth MOSFETs of the source follower 200 affects the value of the pole frequency $\omega_{P\_EF}$ as expressed in Equation (3). Since the value of the mutual conductance gm2 of the MOSFET has some variations due to variations in transistor manufacturing, in order to accurately match the zero point frequency $\omega z1$ of the core circuit 100 with the pole frequency $\omega_{P\_EF}$ of the source follower 200, a calibration loop for mutual conductance gm2 fine adjustment as illustrated in FIG. 1 is used in the present embodiment.

An EYE monitor 500 illustrated in FIG. 1 is a device or a circuit that monitors an eye pattern based on a transmitted signal waveform after the equalizer core circuit 100 and the source follower 200 are connected and mounted on a transmission path. Usually, the EYE monitor incorporated in a receiver is used.

In the eye pattern, transition of the signal waveform is switched every bit, and a large amount of transition of the signal waveform is sampled, overlapped, and displayed graphically. When a plurality of waveforms are overlapped at the same position (timing and voltage) (when the eye pattern opening portion is open), quality of the waveforms is good, which is used to determine that a transmission characteristic is good.

The EYE monitor 500 creates an eye pattern according to a transmission signal after A/D conversion of outputs of the equalizer core circuit 100 and the source follower 200 by the receiver, and outputs an opening degree of the eye pattern opening portion according to evaluation values of a height (V) of the opening portion and a width (time) of the opening portion.

A CAL 400 illustrated in FIG. 1 is a logic circuit that controls a gm2 adjustment unit 300 to provide a displacement amount stepwise to the value of the mutual conductance gm2 of the third MOSFET 201 and the fourth MOSFET 202 of the source follower 200, that acquires an eye pattern evaluation result of the EYE monitor 500 monitoring the eye pattern at each stage, and that executes a calibration loop for searching for and setting a gm2 adjustment value at which the opening degree of the eye pattern opening portion is the maximum.

Figure 3:
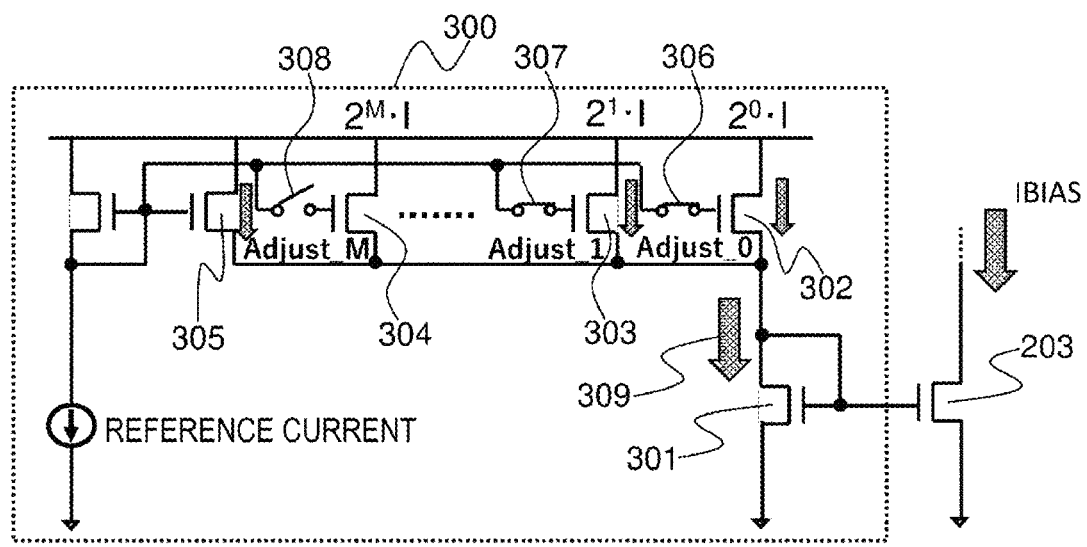
FIG. 3 is a circuit diagram illustrating an example of a configuration of a gm2 adjustment unit that adjusts a value of a mutual conductance gm2 of the equalizer.

An example of a configuration of the gm2 adjustment unit 300 is illustrated in FIG. 3. The gm2 adjustment unit 300 constitutes a current circuit in which current values flowing through transistors 302, 303, and 304 are weighted by $2^0$, $2^1$ . . . , $2^M$, switches 306, 307, and 308 are subjected to ON/OFF switching control, and when, for example, M=5, the current 309 is switched in 64 stages ($2^6$ division).

The value of the mutual conductance gm2 of the third MOSFET 201 is proportional to a signal current IBIAS (drain current). By switching a gate voltage stepwise from the gm2 adjustment unit 300 in the variable bias current source 203, the displacement amount is applied to the signal current IBIAS stepwise, and the gm2 value is adjusted.

Similarly, in the adjustment of the value of the mutual conductance gm2 of the fourth MOSFET 202, a gm2 adjustment unit 301 having the same configuration is connected to a gate terminal of the variable bias current source 204 connected to the source node wiring 222 of the fourth MOSFET (the CAL 400 controls the gm2 adjustment unit 301 simultaneously with the gm2 adjustment unit 300).

Figure 10:
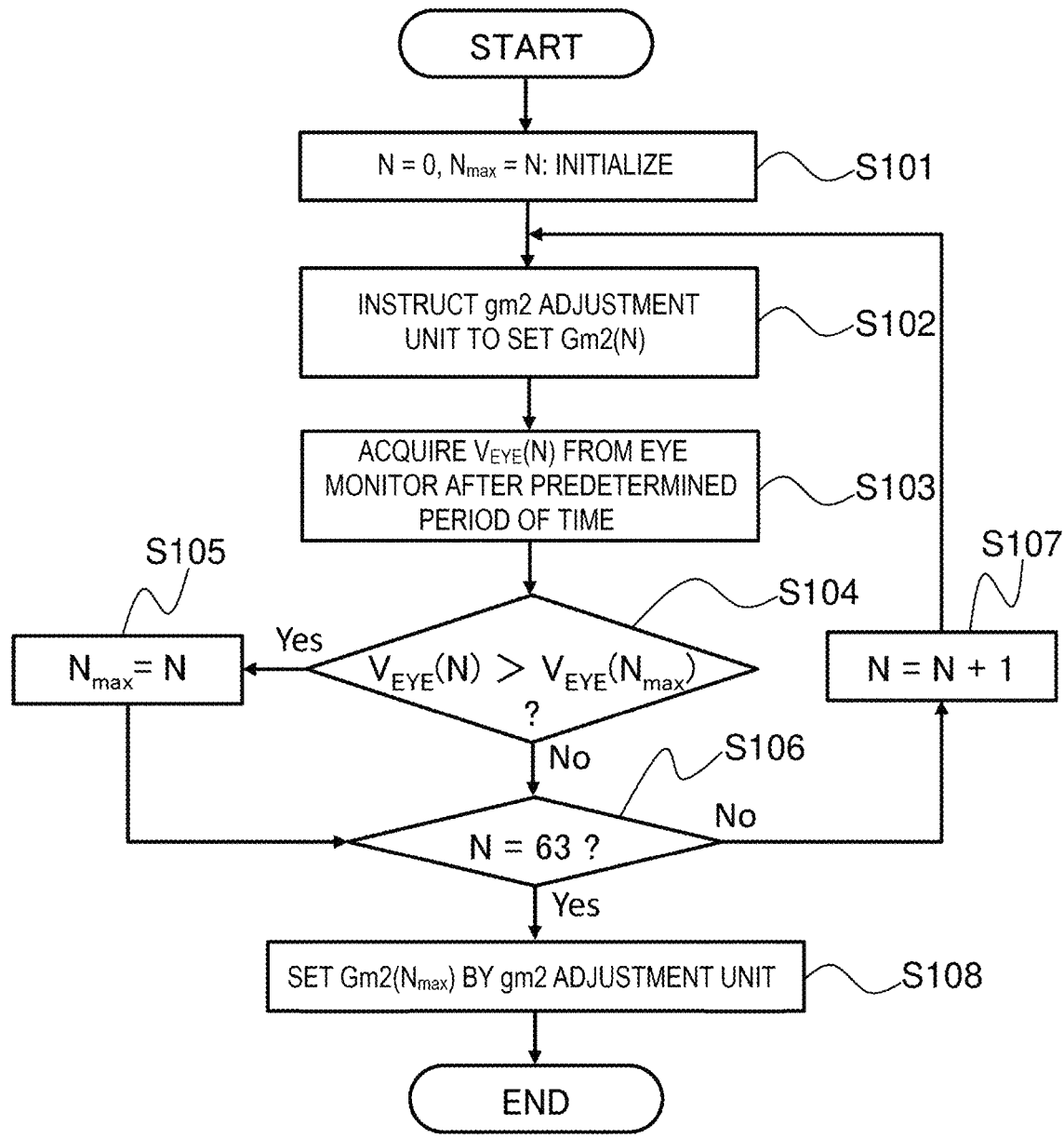
FIG. 10 is an example of a control flowchart of a calibration loop for searching for and setting a gm2 adjustment value at which an opening degree of an eye pattern opening portion to be executed by the CAL is the maximum.

FIG. 10 illustrates an example of a control flowchart of a calibration loop for searching for and setting a gm2 adjustment value at which the opening degree of the eye pattern opening portion to be executed by the CAL 400 is the maximum. The calibration loop is started at a time point at which capacitor switching control of the zero point generation circuit of the equalizer core circuit is executed, a time point at which capacitance switching control of the source follower is executed, or a time point of continuous operation.

In step S101, when control variables N=0 and $N_{max}$=N, initialization is executed.

In step S102, the gm2 adjustment units 300 and 301 are instructed to set Gm2(N), which is an identification variable in a stage of providing a displacement amount to the gm2 value stepwise ($2^M$ division). The gm2 adjustment units 300 and 301 execute ON/OFF switching control of the switches 306, 307, and 308 corresponding to the Gm2(N) to variably control the gm2 value.

In step S103, after a predetermined period of time, an opening portion height $V_{EYE}(N)$ of the eye pattern opening portion is acquired from the EYE monitor 500 that monitors an eye pattern of a transmission signal having passed through the source follower having the gm2 value set in S102.

In step S104, $V_{EYE}(N) > V_{EYE}(N_{max})$ are compared, and if yes, the process proceeds to S105, and if no, the process proceeds to S106.

In step S105, $N_{max} = N$ is executed, and the process proceeds to S106.

In step S106, N=63 is determined, and if yes, the process proceeds to S108, and if no, the process proceeds to S107.

In step S107, N=N+1 is executed, and the process proceeds to S102.

In step S108, the gm2 adjustment units 300 and 301 are instructed to set $Gm2(N_{max})$, and calibration loop processing is terminated.

By the calibration loop processing executed by the CAL 400 described above, it is possible to obtain the pole frequency $\omega_{P\_EF}$ of the source follower 200 that accurately coincides with the zero point frequency $\omega z1$ of the core circuit 100 illustrated in FIG. 4.

In the example of the calibration loop, in S103, the height (V) of an opening portion is acquired as the evaluation value of the opening degree of the eye pattern opening portion from the EYE monitor 500, and the gm2 value at which the opening degree of the eye pattern opening portion is the maximum is searched for. However, instead of the height (V) of the opening portion, the width (time) of the opening portion or both the height (V) of the opening portion and the width (time) of the opening portion may be used as the evaluation value of the opening degree of the eye pattern opening portion.

In the example of the calibration loop, in S102, the CAL 400 simultaneously instructs the gm2 adjustment units 300 and 301 to set the same Gm2 (N) at the same time, and executes adjusting to simultaneously apply the values of the mutual conductance gm2 of the third MOSFET 201 and the fourth MOSFET 202 to the same displacement amount. In S108, the gm2 values of both MOSFETs having the maximum opening degree of the eye pattern opening portion are set. However, a calibration method is not limited thereto, the gm2 value of one MOSFET may be fixed freely, and the displacement amount may be applied stepwise only to the gm2 value of the other MOSFET to individually execute the calibration loop for searching for the gm2 value at which the opening degree of the eye pattern opening portion is the maximum.

In the example of the calibration loop, in all stages (64 patterns) in which the displacement amount is applied to the gm2 value of the gm2 adjustment units 300 and 301 stepwise, the opening degree of the eye pattern opening portion is monitored, and the gm2 value at which the opening degree is the maximum is searched for. However, a calibration loop method is not limited to this method.

For example, in a process of applying the displacement amount to the gm2 value stepwise, when the evaluation value of the opening degree of the eye pattern opening portion tends to be a peak, a method of identifying the stage of the peak and terminating the calibration loop at a time point at which it is confirmed that the evaluation value of the opening degree changes from increasing tendency to descending tendency is considered. That is, it is possible to improve the efficiency of the calibration, instead of searching for all of the 64 patterns.

As described above, according to the first embodiment of the invention, it is possible to reduce a minimum equalization gain at the time of setting the lower limit gain. As a result, it is possible to provide an equalizer that has a wide variable gain range and that can implement equalization for a communication medium such as on-board wiring and a cable having various wiring lengths.

Second Embodiment

Figure 2:
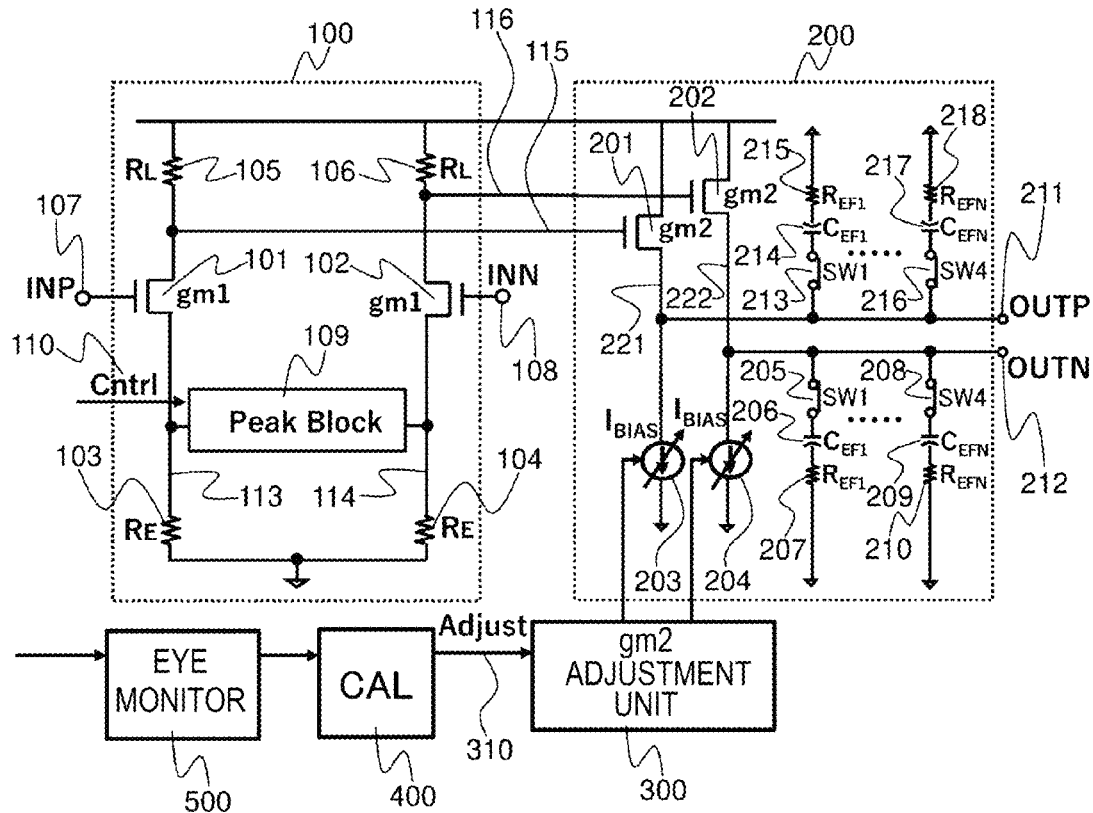
FIG. 2 is a circuit diagram illustrating an equalizer according to a second embodiment.

FIG. 2 is a circuit diagram illustrating an equalizer according to a second embodiment which is one of the embodiments of the invention. The same configurations as those of the equalizer core circuit 100 and the source follower 200 in FIG. 1 are denoted by the same reference numerals, and differences will be mainly described. In the source follower 200 in FIG. 2, loads in which the capacitive elements 206 and 214 and the resistor elements 207 and 215 are respectively connected in series via the ON/OFF switches 205 and 213 are arrayed and connected to the source node wiring 221 and 222 of the third MOSFET 201 connected to the output terminal (OUTP) 211 and the fourth MOSFET 202 connected to the output terminal (OUTN) 212 (a load in which a switch 213, a capacitive element 214, and a resistor element 215 are connected in series is connected to the source node wiring 221 in four columns, and a load in which the switch 205, the capacitive element 206, and the resistor element 207 are connected in series is connected to the source node wiring 222 in four columns). The switch having the same number is simultaneously controlled to be ON/OFF according to a control signal (not shown).

Figure 5:
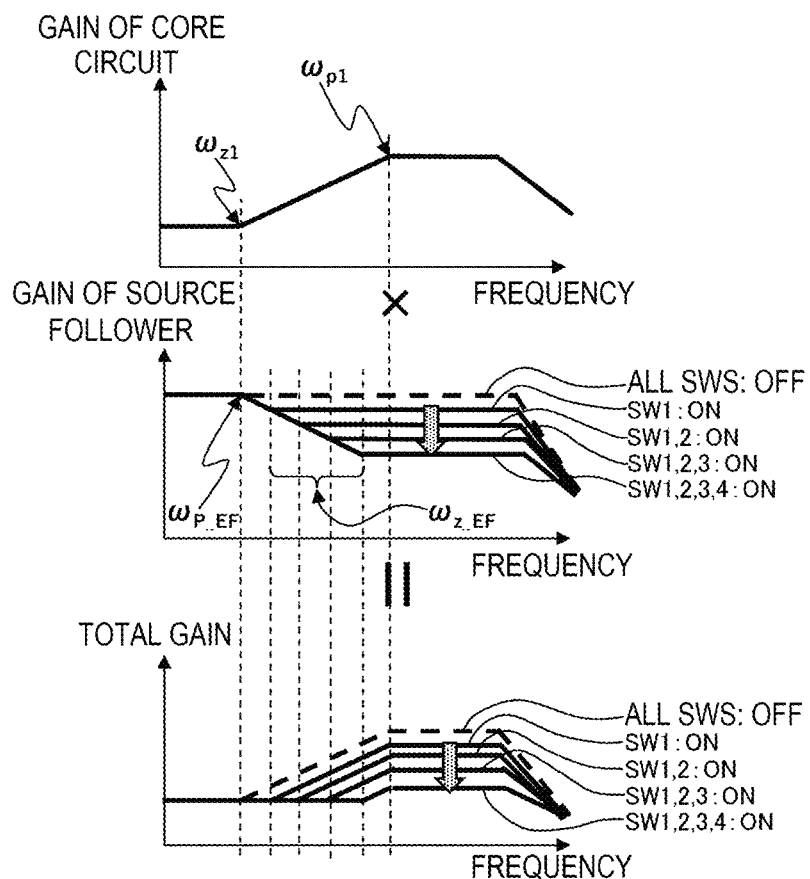
FIG. 5 is a diagram illustrating a gain range expansion effect attained by connecting a source follower to an equalizer core circuit according to the second embodiment and implementing the equalizer.

FIG. 5 illustrates a gain range expansion effect attained by connecting the source follower 200 to the equalizer core circuit 100 according to a second embodiment and implementing the equalizer.

The upper graph is a graph schematically illustrating a gain of the output of the core circuit 100 alone according to the second embodiment, and the frequency characteristic of the gain when the lower limit gain is set in the zero point generation circuit 109 (the same as the upper graph of FIG. 4 in the first embodiment). $\omega z1$ represents the zero point frequency (Equation (1)), and $\omega p1$ represents a pole frequency (Equation (2)).

The middle graph is a graph schematically illustrating the frequency characteristic of the gain when the gain of the output of the source follower 200 alone according to the second embodiment is controlled by switching the ON/OFF switches 205, 213 . . . $\omega_{P\_EF}$ represents a pole frequency, and $\omega_{Z\_EF}$ represents a zero point frequency.

$$\omega_{P\_EF} = gm2/C_{EF\_TOTAL}(1 + gm2 \cdot R_{EF\_TOTAL}) \qquad (5)$$

$$\omega_{Z\_EF} = 1/C_{EF\_TOTAL} \cdot R_{EF\_TOTAL} \qquad (6)$$

Here, gm2 represents mutual conductances of the third MOSFET 201 and the fourth MOSFET 202, $C_{EF\_TOTAL}$ represents a sum of $C_{EF}$ when the switch is turned on, and $R_{EF\_TOTAL}$ represents a combined resistance value of $R_{EF}$ when the switch is turned on.

In this case, when the resistor element value and the capacitive element value are appropriately set, only the zero point frequency $\omega_{Z\_EF}$ may be changed by an ON state of the switch substantially without changing the (first) pole frequency $\omega_{P\_EF}$ of the source follower. Each switch is controlled to be ON/OFF according to the control signal (not shown), and the frequency characteristic of the gain is lowered stepwise (four stages in the present embodiment) as illustrated in FIG. 5.

The lower graph is a graph schematically illustrating the frequency characteristic of the total gain of the equalizer including the core circuit 100 and the source follower 200 according to the second embodiment illustrated in FIG. 2. By multiplying the frequency characteristic of the gain of the core circuit and the frequency characteristic of the gain of the source follower, an effect of enlarging a variable gain on the lower limit side (decreasing to a desired gain in a desired frequency region) can be expected as the frequency characteristic of the total gain.

Therefore, also in the present embodiment, it is necessary to approximately adjust the capacitance value $C_{EF}$ of each capacitive element of the source follower 200 and the resistance value $R_{EF}$ of each resistor element such that the zero point frequency ωz1 of the core circuit 100 and the pole frequency $ω_{P\_EF}$ of the source follower 200 coincide with each other.

The value of the mutual conductance gm2 of the third and fourth MOSFETs of the source follower 200 affects the value of the pole frequency $ω_{P\_EF}$ as expressed in Equation (5). Since the value of the mutual conductance gm2 of the MOSFET has some variations due to variations in transistor manufacturing, in order to accurately match the zero point frequency ωz1 of the core circuit 100 with the pole frequency $ω_{P\_EF}$ of the source follower 200, a calibration loop for mutual conductance gm2 fine adjustment as illustrated in FIG. 2 is used also in the present embodiment.

Figure 6A:
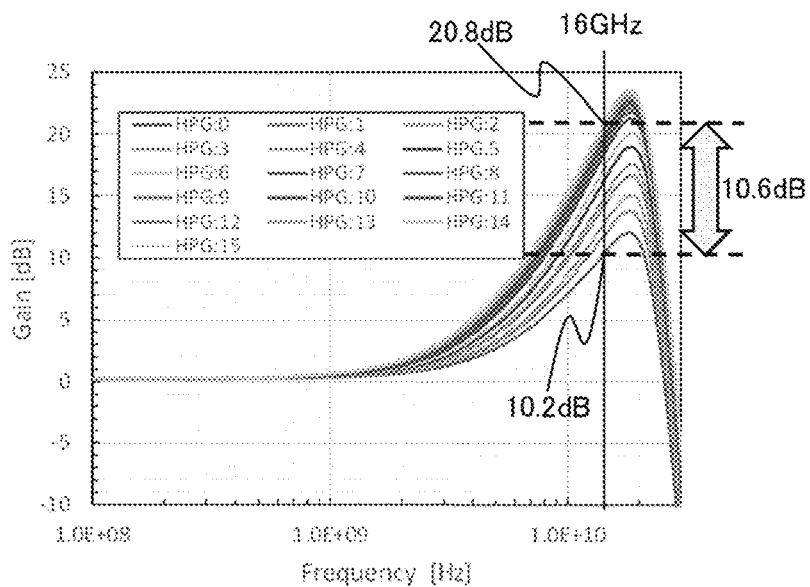
FIG. 6A is a graph illustrating a result of a simulation of a frequency characteristic of a gain of an output terminal when a capacitor of a zero point generation circuit is variously changed in an equalizer in the related art.
Figure 6B:
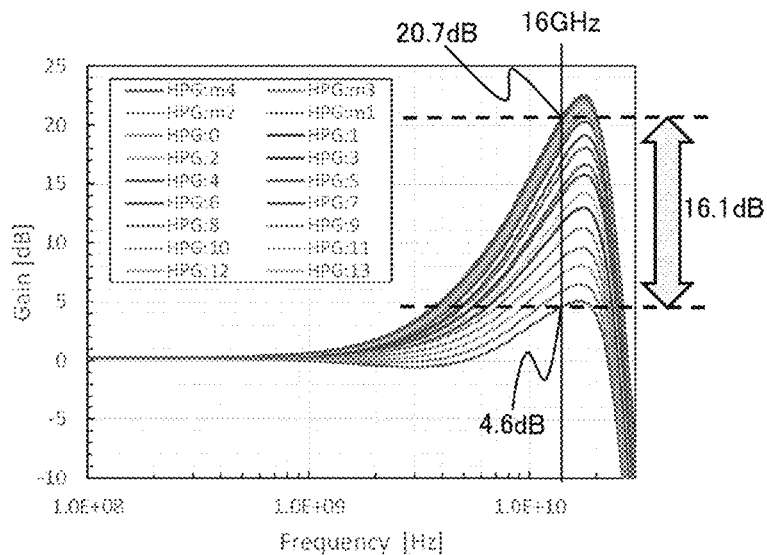
FIG. 6B is a graph illustrating a result of a simulation of a frequency characteristic of a gain of an output terminal when load changeover switches of a zero point generation circuit and the source follower of the equalizer according to the second embodiment are variously switched.

FIGS. 6A and 6B illustrate results of simulating the frequency characteristics of the gains of the output terminals (OUTP and OUTN) by variously switching the capacitor of the zero point generation circuit in the equalizer in the related art illustrated in FIG. 11 and by variously switching the load changeover switch of the source follower according to the second embodiment in the equalizer according to the second embodiment illustrated in FIG. 2.

In the equalizer in the related art illustrated in FIG. 6A, at a desired frequency (for example, a Nyquist frequency of 16 GHz of PCIe 5.0), an equalization gain is 10.2 dB when the lower limit gain is set and 20.8 dB when the upper limit gain is set, and the variable gain range is 10.6 dB. On the other hand, in the equalizer according to the second embodiment illustrated in FIG. 6B, at a frequency of 16 GHz, the equalization gain is 4.6 dB when the lower limit gain is set and 20.7 dB when the upper limit gain is set, the variable gain range is 16.1 dB, and a result that the variable gain range can be improved by 5.5 dB by application of the source follower 200 according to the present embodiment is obtained.

Third Embodiment

Figure 7:
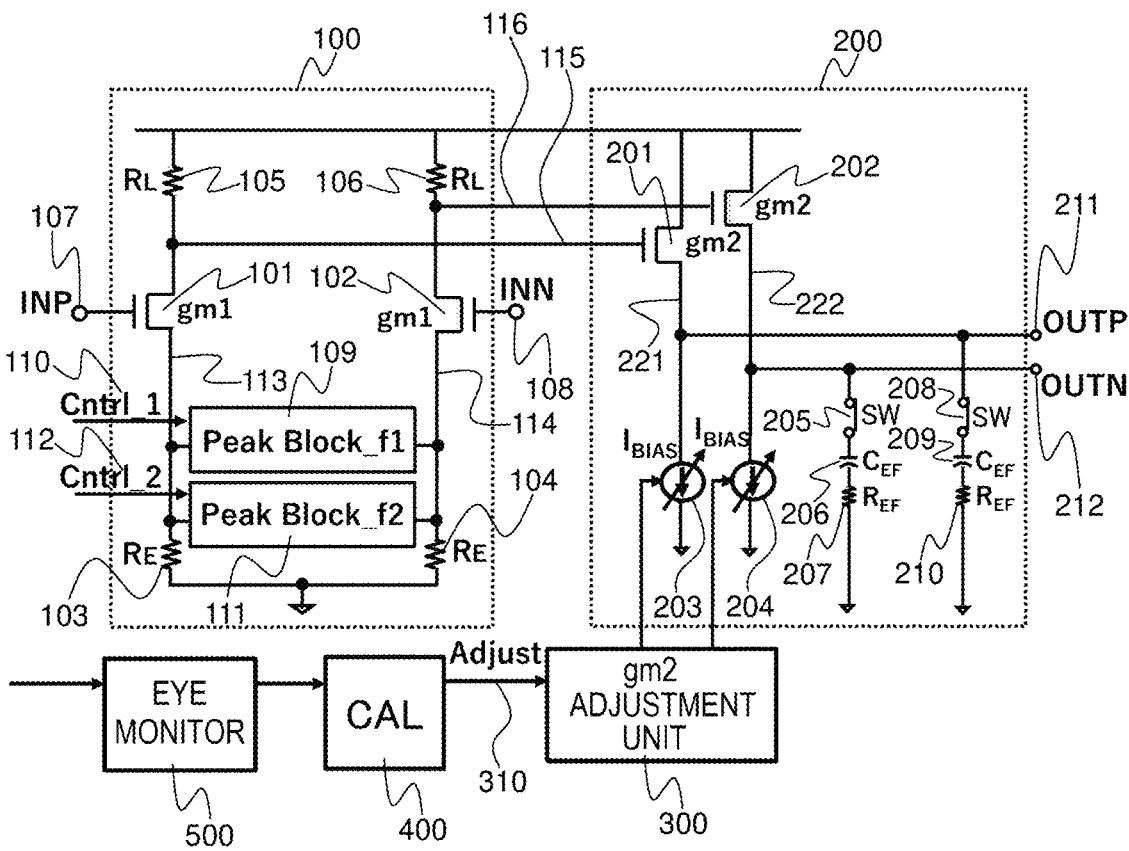
FIG. 7 is a circuit diagram illustrating an equalizer according to a third embodiment.

FIG. 7 is a circuit diagram illustrating an equalizer according to a third embodiment which is one of the embodiments of the invention. The same configurations as those of the equalizer core circuit 100 and the source follower 200 in FIG. 1 are denoted by the same reference numerals, and differences will be mainly described. In the core circuit 100 in FIG. 7, in addition to the zero point generation circuit (Peak Block_f1) 109 having a zero point frequency f1 of a first frequency band between the source node wiring 113 and 114 of the differential pair including the first MOSFET 101 and the second MOSFET 102, a zero point generation circuit (Peak Block_f2) 111 having a zero point frequency f2 of a second frequency band is connected. A control signal 110 for controlling the ON/OFF of the capacitance changeover switch is input to the zero point generation circuit 109, and a control signal 112 is input to the zero point generation circuit 111, so that a peak characteristic can be adjusted.

In the equalizer core circuit 100 according to a third embodiment, an equalization gain can be independently set in each frequency band by the zero point generation circuit 109 and the zero point generation circuit 111, a wide frequency band can be compensated for by the equalizer core circuit 100 according to the first embodiment, but an influence of the parasitic capacitor increases, and the gain when the lower limit gain is set is less likely to decrease. However, by connecting the source follower 200 illustrated in FIG. 7 to the subsequent stage of the core circuit 100, it is possible to lower the gain when the lower limit gain is set in the same manner as in the first embodiment.

In the first to third embodiments described above, configuration examples of the first MOSFET 101 and the second MOSFET 102 of the equalizer core circuit 100 and the third MOSFET 201 and the fourth MOSFET 202 of the source follower 200 are described, and the same effect can be attained using a bipolar transistor.

Fourth Embodiment

An equalization system using the equalizer core circuit 100, the source follower 200, the EYE monitor 500, the CAL 400, and the gm2 adjustment unit 300 described in the first to third embodiments will be described.

Figure 8:
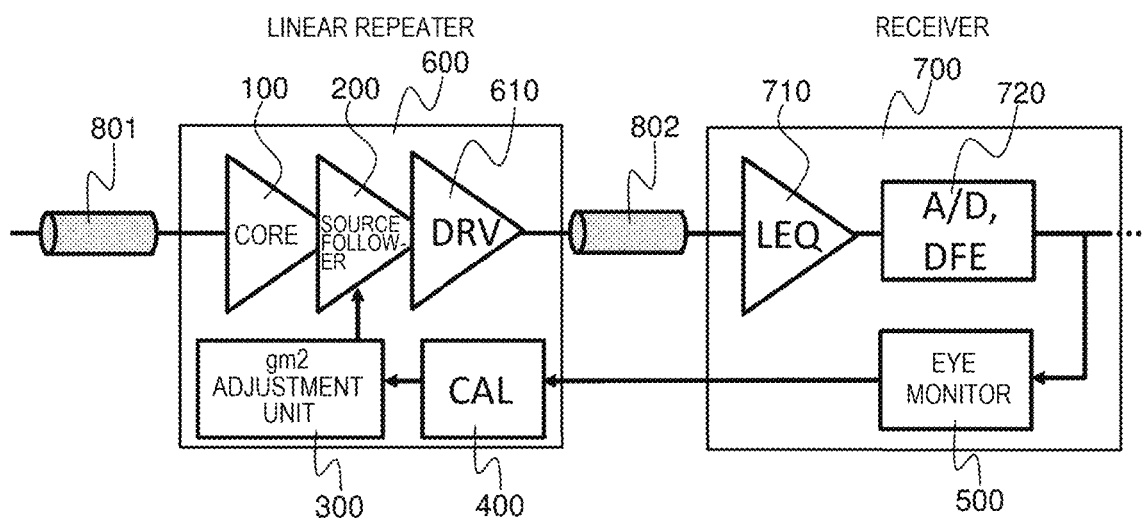
FIG. 8 is a diagram illustrating a configuration example of an equalization system in which the equalizer core circuit, the source follower, a CAL, and a gm2 adjustment unit are mounted on a linear repeater.
Figure 14:
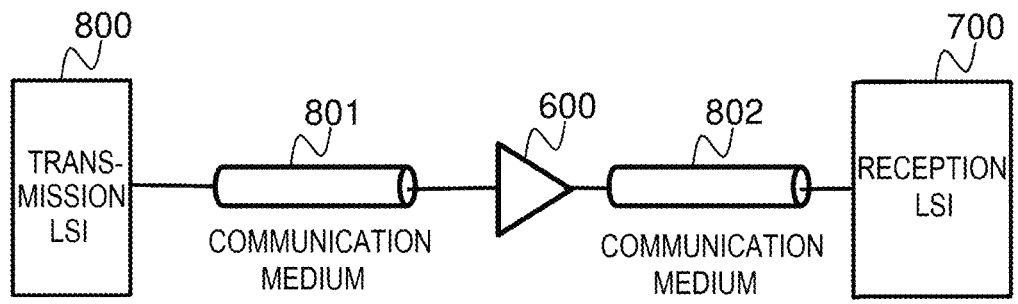
FIG. 14 is a block diagram illustrating an electrical signal transmission device that executes communication via a communication medium including an equalization system according to a fourth embodiment.

As illustrated in FIG. 8, in a fourth embodiment, the equalizer core circuit 100 and the source follower 200 are mounted in the linear repeater 600. As illustrated in FIG. 14, the linear repeater 600 can equalize and compensate a loss of a data signal transmitted by a transmission LSI 800 in a communication medium 801 by inserting the linear repeater 600 into a subsequent stage of the communication medium 801. Accordingly, a subsequent stage of the linear repeater 600 can be further connected to a reception LSI 700 via a communication medium 802, and as a result, a communication distance between the transmission LSI and the reception LSI may be extended.

The linear repeater 600 illustrated in FIG. 8 is connected to a terminal of the communication medium 801, mounted with the equalizer core circuit 100 and the source follower 200, and includes a driver circuit (DRV) 610 that drives input impedance of the reception LSI 700 connected to the subsequent stage of the linear repeater 600 via the communication medium 802 in a final stage.

The receiver 700 is connected to a terminal of the communication medium 802 and mounted with a linear equalization circuit (LEQ) 710 and an A/D converter and decision feedback equalizer (DFE) 720, and the EYE monitor 500 is usually incorporated in the receiver.

An eye pattern of a transmission signal received by the receiver is created by the EYE monitor 500. By the CAL 400 and the gm2 adjustment unit 300 that are mounted on the linear repeater 600, an evaluation value of an opening degree of an eye pattern opening portion is received from the EYE monitor 500, a calibration loop of the gm2 adjustment is executed, and an optimum gm2 value of a MOSFET of the source follower 200 is adjusted.

Figure 15:
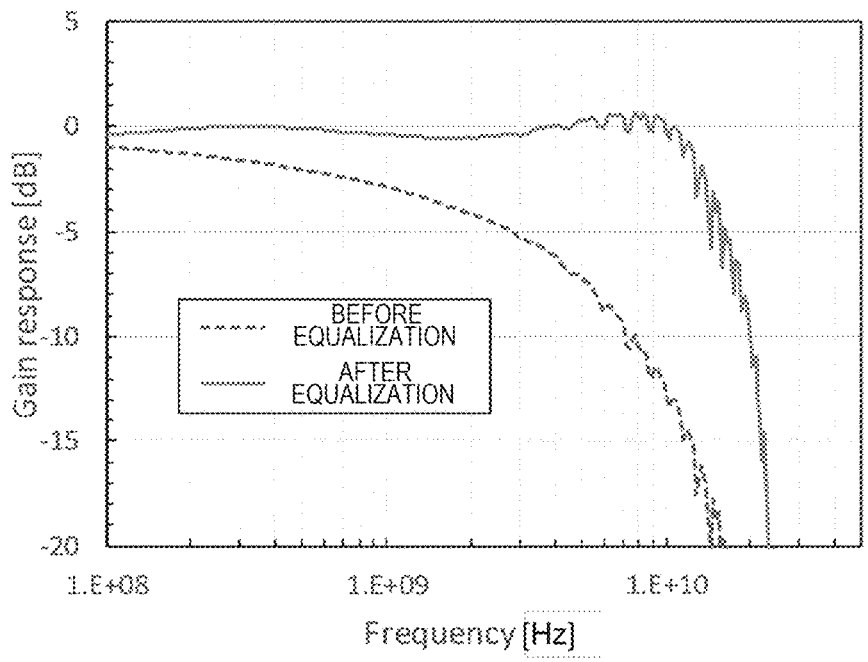
FIG. 15 is a graph illustrating an effect of equalizing and compensating a loss in the communication medium using the equalization system according to the fourth embodiment.

FIG. 15 illustrates an effect of equalizing and compensating the loss in the communication medium 801 by inserting the linear repeater 600 according to the present embodiment into the subsequent stage of the communication medium 801.

Fifth Embodiment

Figure 9:
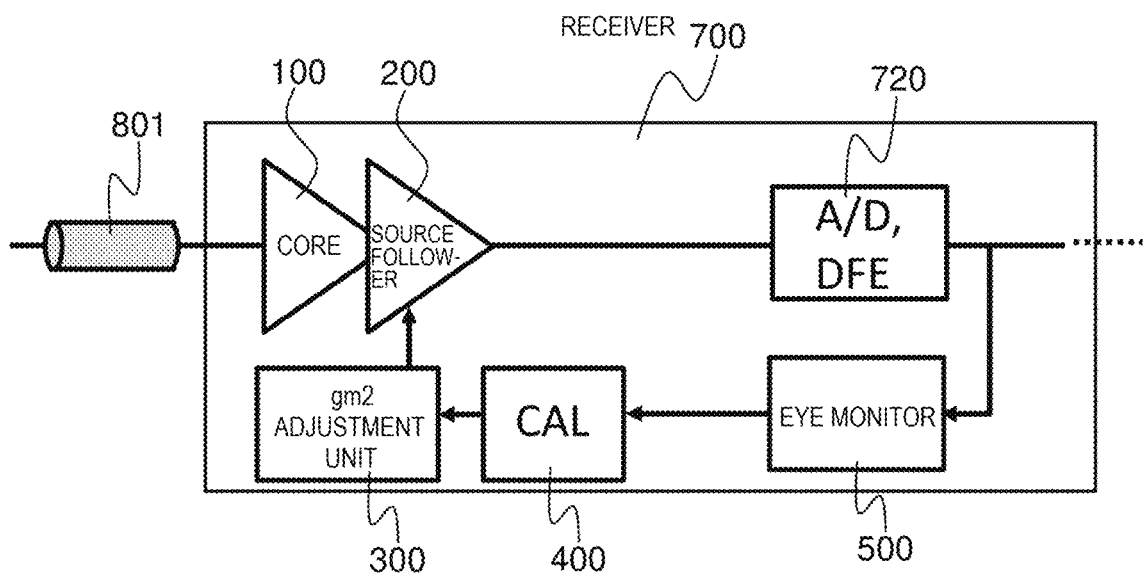
FIG. 9 is a diagram illustrating a configuration example of an equalization system in which the equalizer core circuit, the source follower, the CAL, and the gm2 adjustment unit are mounted on a receiver.

As illustrated in FIG. 9, a fifth embodiment is an example of an equalization device in which all of the equalizer core circuit 100, the source follower 200, the EYE monitor 500, the CAL 400, and the gm2 adjustment unit 300 described in the first to third embodiments are mounted in the receiver 700.

In the receiver 700, it is possible to provide an equalization device that has a wide variable gain range and that can implement equalization for a communication medium such as on-board wiring and a cable having various wiring lengths.

What is claimed is:

1. An equalizer comprising:
a core circuit configured to receive a signal transmitted via a communication medium; and
a source follower connected to a subsequent stage of the core circuit, wherein
the core circuit includes a differential pair including a first transistor and a second transistor,
a first terminal of the first transistor and a first terminal of the second transistor are connected to an input terminal,
a first resistor is connected to second terminals of the first and second transistors,
a zero point generation circuit is connected between the second terminal of the first transistor and the second terminal of the second transistor, and
a second resistor is connected to third terminals of the first and second transistors, and
the source follower includes a third transistor that connects a first terminal to the third terminal of the first transistor and a fourth transistor that connects a first terminal to the third terminal of the second transistor,
a variable bias current source is connected to second terminals of the third and fourth transistors, and
a load in which a capacitive element and a resistor element are connected in series via a switching element is connected to wiring that connects the second terminals of the third and fourth transistors to an output terminal.

2. The equalizer according to claim 1, wherein
a plurality of loads, in which the switching element, the capacitive element, and the resistor element are connected in series, are connected in parallel in the same sequence to the wiring that connects the second terminals of the third and fourth transistors to the output terminal, and
a zero point frequency of the source follower is to be switched by interrupting the switch element with a control signal.

3. The equalizer according to claim 1, wherein
the zero point generation circuit includes one or more zero point generation unit circuits,
each zero point generation unit circuit includes the capacitive element and the switch element, and
a zero point frequency of the zero point generation circuit is to be switched by interrupting the switch element of the zero point generation unit circuit with a control signal.

4. The equalizer according to claim 1, wherein
the zero point generation circuit configured to equalize a first frequency band between the second terminal of the first transistor and the second terminal of the second transistor and a second zero point generation circuit configured to equalize a frequency band different from the first frequency band are connected.

5. The equalizer according to claim 1, wherein
the transistor is implemented by a MOS transistor or a bipolar transistor,
when the transistor is the MOS transistor, the first terminal is a gate terminal, the second terminal is a source terminal, and the third terminal is a drain terminal, and
when the transistor is the bipolar transistor, the first terminal is a base terminal, the second terminal is an emitter terminal, and the third terminal is a collector terminal.

6. An equalization system, wherein
the equalizer according to claim 1, is mounted on a linear repeater,
a loss of a data signal transmitted by a first communication medium in the communication medium is equalized and compensated by the equalizer,
the compensated data signal is transmitted to a receiver via a second communication medium by a driver circuit of the linear repeater,
an EYE monitor provided in the receiver monitors an eye pattern based on a waveform of the received data signal and outputs an evaluation value of an opening degree of an eye pattern opening portion,
a CAL logic circuit provided in the linear repeater executes a calibration loop in which control is executed to apply a displacement amount stepwise to a value of a mutual conductance gm2 of third and fourth transistors of the equalizer, in which an evaluation value of an opening degree of the eye pattern opening portion of a data signal equalized by the equalizer at each stage is acquired from the EYE monitor, and in which a gm2 adjustment value is searched for and set at which the opening degree of the eye pattern opening portion at maximum, and
a gm2 adjustment unit mounted on the linear repeater receives a control instruction to apply the displacement amount stepwise from the CAL logic circuit to the gm2 value, and applies a voltage corresponding to a first terminal of a variable bias current source connected to second terminals of the third and fourth transistors of the equalizer according to the control instruction.

7. An equalization system, wherein
the equalizer according to claim 1, is mounted on a receiver,
a loss of a data signal transmitted by a communication medium in the communication medium is equalized and compensated by the equalizer,
by an A/D converter and DFE of the receiver, the compensated data signal is subjected to A/D conversion and equalized at a timing of a receiver clock,
an EYE monitor provided in the receiver monitors an eye pattern based on a waveform of the received data signal and outputs an evaluation value of an opening degree of an eye pattern opening portion,
a CAL logic circuit provided in the receiver executes a calibration loop in which control is executed to apply a displacement amount stepwise to a value of a mutual conductance gm2 of third and fourth transistors of the equalizer, in which an evaluation value of an opening degree of the eye pattern opening portion of a data signal equalized by the equalizer at each stage is acquired from the EYE monitor, and in which a gm2 adjustment value is searched for and set at which the opening degree of the eye pattern opening portion at maximum, and
a gm2 adjustment unit mounted on the receiver receives a control instruction to apply the displacement amount stepwise from the CAL logic circuit to the gm2 value, and applies a voltage corresponding to a first terminal of a variable bias current source connected to second terminals of the third and fourth transistors of the equalizer according to the control instruction.

8. The equalization system according to claim 6, wherein the CAL logic circuit starts the calibration loop at a time point at which capacitance switching control of a zero point generation circuit of the equalizer or a source follower is executed, or at a time point of continuous operation, sequentially outputs an instruction to apply the displacement amount stepwise to the value of the mutual conductance gm2 of the third and fourth transistors of the equalizer step by step to the gm2 adjustment unit, obtains an evaluation value of an opening degree of the eye pattern opening portion from the EYE monitor in which an eye pattern is created based on a data signal obtained by the equalizer executing equalizing by the gm2 value, the gm2 value being variably controlled by the gm2 adjustment unit by one stage, and compares the evaluation value of the opening degree of the eye pattern opening portion obtained at each stage in which the displacement amount is applied stepwise to the gm2 value, identifies the displacement amount applied to the gm2 value at the stage in which a maximum evaluation value is obtained, and instructs the gm2 adjustment unit to set gm2.

9. The equalization system according to claim 8, wherein the gm2 adjustment unit constitutes a current circuit in which current values flowing through a plurality of (M+1) transistors connected in parallel are each weighted to a respective one of $2^0$, $2^1 \ldots$, and $2^M$, and in which a switching element connected to each transistor is intermittently controlled to switch a current in a $2^{M+1}$ stage, and switches and applies a voltage stepwise to a first terminal of a variable bias current source connected to the second terminals of the third and fourth transistors of the equalizer, and variably controls each gm2 value.

10. The equalization system according to claim 8, wherein the EYE monitor creates an eye pattern based on the data signal obtained by the equalizer executing equalizing by the gm2 value, the gm2 value being variably controlled by the gm2 adjustment unit by one stage, and outputs a height (V) of an opening portion, a width (time) of an opening portion, or both the height (V) of an opening portion and the width (time) of an opening portion as the evaluation value of the opening degree of the eye pattern opening portion.

* * * * *